Figures 1, 2:
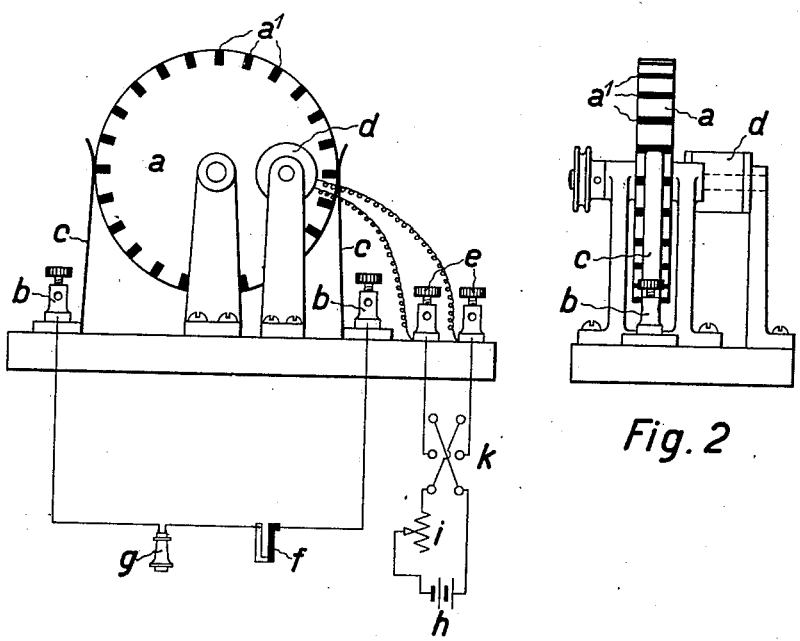

April 20, 1926.

R. MECHAU 1,581,754

ELECTRIC CURRENT INTERRUPTER

Filed August 13, 1921

Inventor
Robert Mechau

Patented Apr. 20, 1926.

1,581,754

UNITED STATES PATENT OFFICE.

ROBERT MECHAU, OF JENA, GERMANY, ASSIGNOR TO THE FIRM CARL ZEISS, OF JENA, GERMANY.

ELECTRIC-CURRENT INTERRUPTER.

Application filed August 13, 1921. Serial No. 492,134.

(GRANTED UNDER THE PROVISIONS OF THE ACT OF MARCH 3, 1921, 41 STAT. L., 1313.)

*To all whom it may concern:*

Be it known that I, ROBERT MECHAU, a citizen of the German Empire, residing at Jena, Germany, have invented a new and useful Electric-Current Interrupter (for which I have filed an application in Germany, May 6, 1920, Patent No. 348,404, May 7, 1920; and England, July 8, 1920, Patent No. 147,485, July 8, 1920), of which the following is a specification.

The present invention relates to interrupters of electric direct currents in which interrupters a round metallic body is rotatably disposed on a base plate. Around the said body are disposed a plurality of pieces of insulating material at about equal distances apart and a plurality of brushes are fitted on the base plate and sliding on the said insulating pieces. Hence, the invention relates to interrupters which, e. g. are put in circuit of a telephone in order to also render perceptible a direct current with the aid of the telephone. In accordance with the invention such interrupters are provided with a number of magnets, which are arranged in such a manner that their lines of force intersect the rotating body. Consequently a device is provided by means of which not only an electric current may be interrupted, but at the same time an additional current produced in the circuit of the current which is to be interrupted, since the rotating metallic body through its movement in the magnetic field acts as the armature of a dynamo. The combination of both properties in one single device may be advantageous, as for example in the following case. When ascertaining weak electric currents, which may be caused by rays of heat impinging upon a thermo-pile, disturbances may occur in that, in the conducting system which contains the thermo-pile and the indicating device, additional electromotive forces become evident, which may render the desired indications difficult, or entirely impossible. Now, if in the circuit of the thermo-pile an interrupter is placed which makes the direct current produced by the thermo-pile noticeable in a telephone, this interrupter may, when constructed according to the invention, simultaneously serve for compensating any disturbing electromotive forces, whereby it is immaterial which signs these forces have and which magnitude within certain limits, so that a special compensating device may be dispensed with. If in the interrupter for producing the magnetic field permanent magnets are used, the magnitude and direction of the currents produced in the rotating metallic body may, for instance, be varied by two such magnets being disposed in such a manner that they produce in the rotating body electromotive forces having opposite signs, and that corresponding to the desired magnitude and direction of the current either the one or the other megnet is brought nearer to the said body. When using electromagnets, the variation of magnitude and direction of the current may be effected by disposing one single magnet only, if provision is made, that the current passing through the magnet coil may be varied as regards magnitude and direction.

The annexed drawing shows an interrupter according to the invention. Fig. 1 is an elevation, Fig. 2 is a side-elevation.

The rotating metallic body of this interrupter consists of a toothed metallic disc $a$, the tooth spaces $a^1$ of which are filled out with insulating material. Two brushes $c$, which are in connection with two binding-screws $b$, slide against the periphery of the disc $a$, and by the side of the disc $a$ an electro-magnet $d$ is disposed, the iron core of which is perpendicular to the disc, and the magnet coil of which is connected to two binding-screws $e$. The interrupter which is shown is intended for interrupting the current furnished by a thermo-element $f$ to ensure that currents which for any prolonged period of time flow with the same, or approximately the same, intensity, are also made audible in a telephone $g$. The electromagnet $d$, which is intended for producing an additional current in the disc $a$ is assumed to be supplied by a battery $h$, which, after connection to a regulating resistance $i$ and a commutator $k$, is to be connected to the binding-screws $e$.

I claim:

In an electric direct current interrupter a base plate, a round metallic body rotatably disposed on the base plate, a plurality of pieces of insulating material disposed around the said body at about equal distance apart, a plurality of brushes fitted on the base plate and sliding on the said insulating pieces, and a magnet system so disposed in the vicinity of the metallic body that its lines of force intersect it.

ROBERT MECHAU.